April 30, 1968   J. M. POUND   3,380,755
HOOP-TYPE CYCLE
Filed March 25, 1966

INVENTOR.
JAMES M. POUND
BY
William C. Babcock
ATTORNEY

United States Patent Office 3,380,755
Patented Apr. 30, 1968

3,380,755
HOOP-TYPE CYCLE
James M. Pound, 1925 Stearnlee Ave.,
Long Beach, Calif. 90815
Filed Mar. 25, 1966, Ser. No. 537,454
3 Claims. (Cl. 280—207)

ABSTRACT OF THE DISCLOSURE

A vehicle that includes a large diameter hoop having a frame disposed within the confines thereof on which a user is supported, which frame is provided with hoop-guiding means and propelling means that may be utilized by the user to cause said vehicle to carry him to a desired destination.

---

For many years the bicycle has been used as a mode of transportation, as well as for amusement purposes. The present invention is adapted to perform the same function as the conventional bicycle, but in a manner that will provide more entertainment for the user thereof, irrespective of whether the present invention is manually propelled or motor-operated.

A major object of the present invention is to provide a hoop-type cycle that has a new and novel mechanical structure, can be fabricated from standard commercially available materials, is simple and easy to use, can be manually propelled or motor-operated if desired, and will perform the same functions as a conventional bicycle, but in a more entertaining manner.

Another object of the invention is to supply a device that is particularly adapted for use at resorts and other places where amusement devices are rented on an hourly or daily basis.

A still further object of the invention is to supply a hoop-type cycle that requires little or no maintenance attention, and can be easily ridden by any person capable of riding a bicycle or motorcycle.

Yet another object of the invention is to provide a device that has entertainment appeal, and one that will stimulate interest in cycling, both by use of the present invention, as well as by bicycles and motorcycles.

These and other objects and advantages of the present invention will become apparent from the following description of a preferred form thereof, and from the accompanying drawing illustrating the same, in which.

Figure 1:
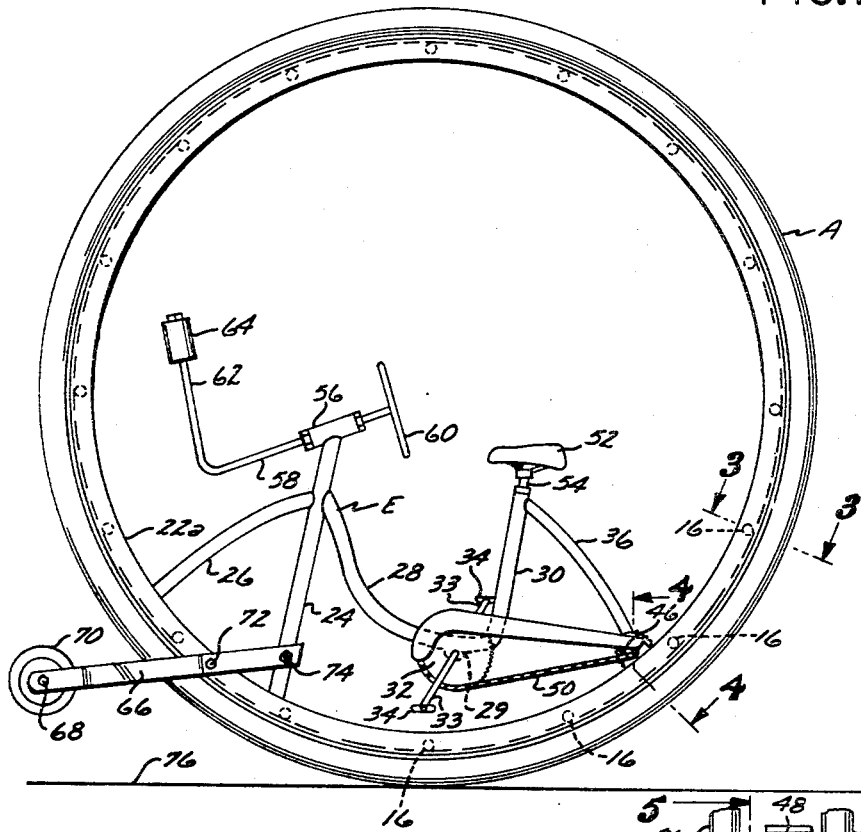
FIGURE 1 is a side elevational view of a preferred form of the invention.

Referring now to the drawing for the general arrangement of the invention, it will be seen that it includes a tire or hoop A, preferably of the pneumatic type, that has an internal diameter of 5 to 6 feet, as may be seen in FIGURE 1, or larger if required, and the tire being mounted on a rim B. The rim B includes two laterally spaced flanges 10, that sealingly engage the bead portions 12 of the tire A. The flanges 10 are connected by a flat web 14. The web 14 on the surface 14a thereof, as may best be seen in FIGURE 4, supports a ring gear C that is preferably formed from a light-weight tough material.

Figure 3:
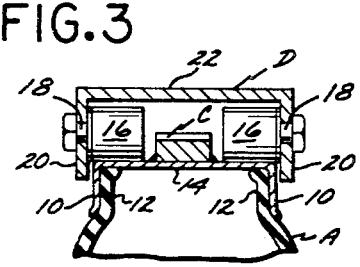
FIGURE 3 is a fragmentary transverse cross-sectional view of the device, taken on the line 3—3 of FIGURE 1.

A number of circumferentially spaced pairs of rollers 16 are provided that rollingly engage the surface 14a of web 14, as best seen in FIGURE 3. The rollers 16 are rotatably supported on stub shafts 18, which may be bolts or the like, that extend inwardly towards one another from the sides 20 of a circular member D that is of channel-shaped transverse cross section.

The roller-supporting member D has the sides 20 thereof connected by a second web 22 that is parallel to the first web 14. A bicycle-like frame E is provided, as shown in FIGURE 1, that includes a generally upwardly extending rigid tubular post 24 that has the lower end thereof secured to the surface 22a of web 22 by conventional means such as welding, or the like (not shown). The post 24 has a first reinforcing member 26 extending forwardly therefrom, which reinforcing member is also connected to the surface 22a by conventional fastening means. Post 24 also supports a downwardly and rearwardly extending curved frame member 28 that is connected on its rearward end to an upright 30. The frame E is preferably formed of tubular stock such as is conventional in the frames of bicycles.

Figure 4:
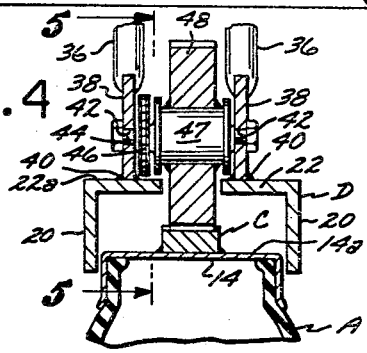
FIGURE 4 is a second fragmentary transverse cross-sectional view of the device, taken on the line 4—4 of FIGURE 1.

The frame member 28 and the upright 30 at their junction 29 rotatably support a sprocket 32 which may be manually rotated by pedals 34 supported on arms 33, as is conventional in bicycle construction. The upright 30 has two laterally spaced rigid members 36 extending downwardly and rearwardly therefrom, as best seen in FIGURE 4. The members 36, at their lower ends, are secured to two parallel laterally spaced plates 38 that are welded at their lower ends by welding beads 40 to the surface 22a of web 22. The two plates 38 have transversely aligned bores 42 formed therein through which a shaft 44 extends.

Figure 5:
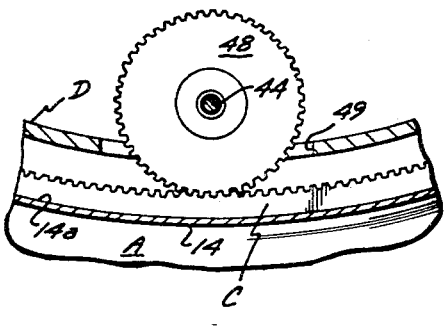
FIGURE 5 is a fragmentary longitudinal cross-sectional view of the device, taken on the line 5—5 of FIGURE 4.

A driven sprocket 46 is rotatably mounted on shaft 44 and is secured to a coaster brake assembly 47 of a type current used on bicycles. The assembly 47 is connected to a gear 48 that meshes with the ring gear C, as shown in FIGURE 4. Gear 48 extends through an opening 49 in circular member D, as shown in FIGURE 5. The driven sprocket 46 is connected to the driving sprocket 32 by an endless chain belt 50. A bicycle-type seat 52 is adjustably secured and supported on the upper portion of the upright 30 by conventional means 54, such as employed in bicycle construction. The post 24, on the upper end thereof, supports a downwardly and forwardly extending tubular member 56 in which a shaft 58 is rotatably supported. The shaft 58 on its rearward end, is provided with a steering wheel 60, or handle bars (not shown).

The shaft 58, on its forward end, develops into an upwardly extending leg 62 that has a relatively heavy weight 64 secured to the upper end thereof. A bifurcated member 66 extends forwardly from the member D, as can best be seen in FIGURE 1, and has a transverse shaft 68 mounted on the forward end thereof that rotatably supports a roller 70. The member 66 on the rearward end thereof is secured by bolts 72 and 74 to the member D, and post 24, respectively.

Figure 2:
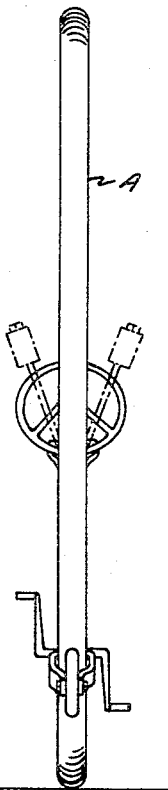
FIGURE 2 is a front elevational view of the device.

The use and operation of the invention is extremely simple. The device is placed in a vertical position, as shown in FIGURES 1 and 2, and the user mounts the device, sitting on the seat 52, and with his feet engaging the pedals 34. By rotating the pedals 34 in a counter-clockwise direciton, as viewed in FIGURE 1, the sprocket 32 is rotated, as is the chain belt 50 to drive the gear 48. As the gear 48 rotates, the ring gear C is forced to rotate relative thereto, with the result that the tire A is rotated relative to the ground surface 76 on which it rests.

When it is desired to turn the vehicle as it is being ridden, the wheel 60 is rotated to move the weight 64 to one side of the vehicle and in the direction to which it is desired to turn, as shown in phantom line in FIGURE 2, or in lieu of use of the weight 64, the user may lean to one side of the vehicle to secure substantially the same result. The bifurcated member 66 and the roller 70 are supported from frame E as previously described, to prevent excessive angulation of the frame E relative the ground surface 76 when the user brakes the vehicle by use of the assembly 47. Should it be desired, the vehicle may be propelled by a motor (not shown) that drives the sprocket 32. If desired, the vehicle above described, may be made in a small size and used as a toy.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:
1. A vehicle that includes:
 (a) a hoop of sufficient internal diameter that a user of said vehicle can be positioned within the confines thereof;
 (b) a rim that supports said hoop;
 (c) a ring gear mounted on the side of said rim opposite that which supports said hoop;
 (d) a bicycle frame disposed inside said rim and secured to the lower portion of said rim;
 (e) a gear rotatably supported from said frame that meshes with said ring gear;
 (f) first means supported from said frame for driving said gear, ring gear, rim and hoop to move said vehicle relative to the surface on which said hoop is supported;
 (g) a seat mounted on said frame on which the user of said device is supported within the confines thereof; and
 (h) second means for steering said vehicle when a user of said vehicle is supported on said seat, which second means includes:
  (1) an upwardly extending post forming a forwardly disposed part of said frame;
  (2) a tubular member mounted on the upper end of said shaft;
  (3) a shaft rotatably supported in said tubular member;
  (4) a leg extending upwardly from the forward end of said shaft;
  (5) a weight mounted on the upper end of said leg; and
  (6) manually operable means on the rear end of said shaft for pivoting the same to dispose said weight on a desired side of said vehicle to turn said vehicle.

2. A vehicle as defined in claim 1 which further includes:
 (i) third means for limiting the angulation of said frame relative the surface supporting said hoop when the velocity of said vehicle is decreased.

3. A vehicle as defined in claim 2 in which said third means includes:
 (j) a bifurcated member that extends forwardly from said frame around said hoop; and
 (k) a roller rotatably supported on the forward end of said bifurcated member.

References Cited

UNITED STATES PATENTS

| 480,585 | 8/1892 | Imlah. | |
| 2,107,766 | 2/1938 | Rose. | |
| 2,815,222 | 12/1957 | Harrison | 280—261 |

FOREIGN PATENTS 20,212   of 1894   Great Britain.

KENNETH H. BETTS, *Primary Examiner.*